United States Patent
De Zwart et al.

(10) Patent No.: US 10,298,916 B2
(45) Date of Patent: May 21, 2019

(54) AUTOSTEREOSCOPIC IMAGE OUTPUT DEVICE

(71) Applicant: KONINKLIJKE PHILIPS N.V., Eindhoven (NL)

(72) Inventors: Siebe Tjerk De Zwart, Valkenswaard (NL); Martin Gerard Hendrik Hiddink, s-Hertogenbosch (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/784,871

(22) Filed: Oct. 16, 2017

(65) Prior Publication Data

US 2018/0048884 A1    Feb. 15, 2018

Related U.S. Application Data

(63) Continuation of application No. 12/865,865, filed as application No. PCT/IB2009/050491 on Feb. 6, 2009, now Pat. No. 9,794,547.

(30) Foreign Application Priority Data

Feb. 11, 2008 (EP) .................................. 08151279

(51) Int. Cl.
 *H04N 13/204* (2018.01)
 *H04N 13/305* (2018.01)
 *H04N 13/317* (2018.01)

(52) U.S. Cl.
 CPC ......... *H04N 13/317* (2018.05); *H04N 13/305* (2018.05)

(58) Field of Classification Search
 CPC ........................ H04N 13/305; H04N 13/317
 (Continued)

(56) References Cited

U.S. PATENT DOCUMENTS 3,409,351 A * 11/1968 Winnek ............... G03B 35/24
                                                                       352/61
6,064,424 A * 5/2000 van Berkel et al. ..........
                                                  G02B 27/2214
                                                             348/42

(Continued)

FOREIGN PATENT DOCUMENTS

| EP | 0791847 A1 | 8/1997 |
| EP | 1191384 A2 | 3/2002 |

(Continued)

OTHER PUBLICATIONS

Van Berkel et al "Characterisation and Optimisation of 3D-LCD Module Design", Proceedings of the SPIE, vol. 3012, Feb. 1997, pp. 179-186.

(Continued)

Primary Examiner — Deirdre L Beasley

(57) ABSTRACT

An autostereoscopic image output device includes an image panel having an array of image pixels defining an image, the image pixels being arranged in rows and columns. An array of parallel lenticular elements is positioned over the image panel, the lenticular elements having optical focal axes that are slanted at an angle ($\phi$) to the image pixel columns. The image output device is operable in first and second modes, with the image panel and lenticular element array rotated by 90 degrees between the modes, thereby providing a landscape mode of operation and a portrait mode of operation, the slant angle $\phi$ in the landscape mode satisfies: $1 \geq \phi \geq 1/2$.

18 Claims, 10 Drawing Sheets

(58) Field of Classification Search
USPC .......................................................... 348/51
See application file for complete search history.

(56) References Cited

U.S. PATENT DOCUMENTS

| | | | | |
|---|---|---|---|---|
| 6,549,720 | B1* | 4/2003 | Yamada | G11B 27/034 |
| | | | | 375/E7.193 |
| 6,847,385 | B1* | 1/2005 | Garritsen | G06T 3/606 |
| | | | | 345/545 |
| 7,215,475 | B2* | 5/2007 | Woodgate | G02B 3/005 |
| | | | | 348/51 |
| 7,492,515 | B2 | 2/2009 | Hamagishi | |
| 7,733,296 | B2* | 6/2010 | Lee | H04N 13/0025 |
| | | | | 13/25 |
| 7,903,332 | B2 | 3/2011 | De Zwart | |
| 7,969,463 | B2* | 6/2011 | Takaki | G02B 27/2214 |
| | | | | 348/59 |
| 2006/0164363 | A1* | 7/2006 | Battersby | G09G 3/2011 |
| | | | | 345/98 |
| 2006/0176541 | A1* | 8/2006 | Woodgate | G02B 27/2214 |
| | | | | 359/237 |
| 2006/0197725 | A1* | 9/2006 | Nam | H04N 13/0409 |
| | | | | 345/87 |
| 2006/0227427 | A1* | 10/2006 | Dolgoff | G02B 3/005 |
| | | | | 359/619 |
| 2006/0268185 | A1* | 11/2006 | Hamagishi | G02B 27/2242 |
| | | | | 349/15 |
| 2006/0284974 | A1* | 12/2006 | Lipton | H04N 5/72 |
| | | | | 348/59 |
| 2007/0103547 | A1* | 5/2007 | Kim | G09G 3/003 |
| | | | | 348/55 |
| 2007/0247708 | A1* | 10/2007 | De Zwart | H04N 13/0404 |
| | | | | 359/463 |
| 2008/0043092 | A1* | 2/2008 | Evans | G02B 27/2214 |
| | | | | 348/36 |
| 2008/0231690 | A1 | 9/2008 | Woodgate | |
| 2008/0252638 | A1* | 10/2008 | Riemens | H04N 13/0003 |
| | | | | 345/419 |
| 2008/0266326 | A1* | 10/2008 | Porwal | G06F 1/1613 |
| | | | | 345/659 |
| 2008/0266387 | A1* | 10/2008 | Krijn | H04N 13/0404 |
| | | | | 348/51 |
| 2008/0299804 | A1* | 12/2008 | Ronkko | H04M 1/0233 |
| | | | | 439/142 |
| 2008/0316379 | A1* | 12/2008 | Zuidema | H04N 13/0404 |
| | | | | 349/15 |
| 2009/0052027 | A1* | 2/2009 | Yamada | G02B 27/2214 |
| | | | | 359/463 |
| 2009/0079762 | A1* | 3/2009 | Fukushima | H04N 13/0022 |
| | | | | 345/621 |
| 2010/0259697 | A1 | 10/2010 | Sakamoto | |
| 2012/0242684 | A1* | 9/2012 | Kim | G06F 3/0481 |
| | | | | 345/619 |

FOREIGN PATENT DOCUMENTS

| | | |
|---|---|---|
| EP | 1566683 A1 | 8/2005 |
| EP | 1705928 A2 | 9/2006 |
| GB | 2415850 A | 1/2006 |
| NO | 2007072289 A2 | 6/2007 |

OTHER PUBLICATIONS

Van Berkel "Multiview 3-D-LCD", Proceedings of SPIE, vol. 2653, 1996, pp. 32-39.

* cited by examiner

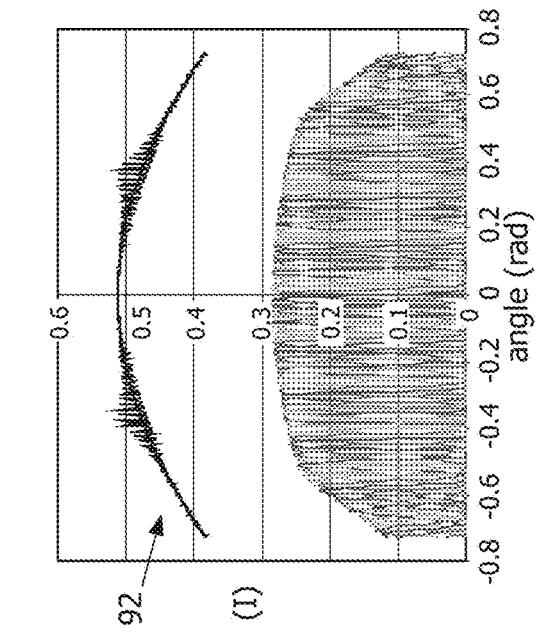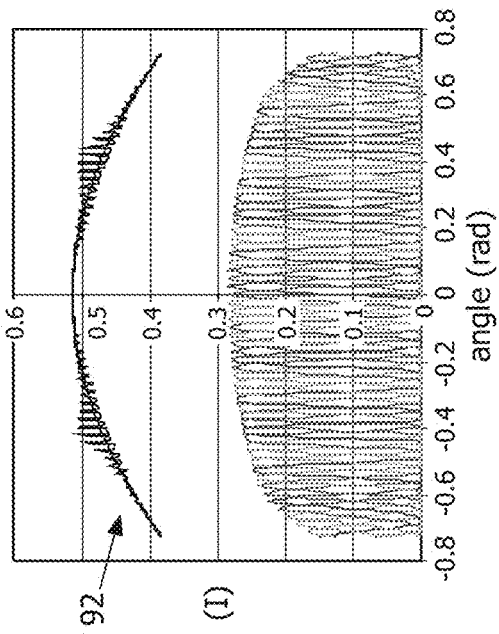
FIG. 9A
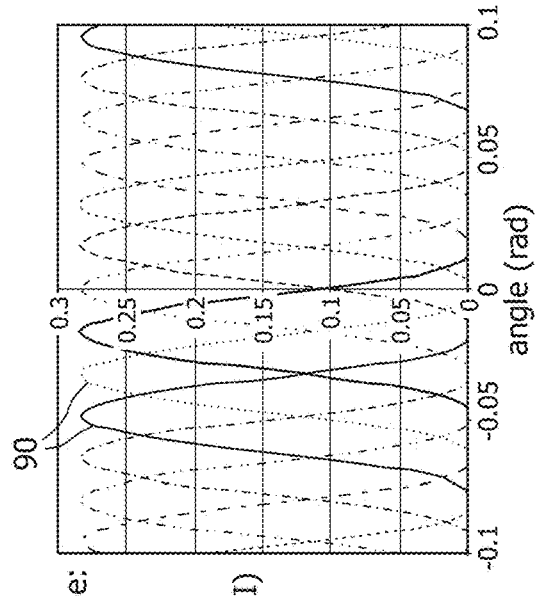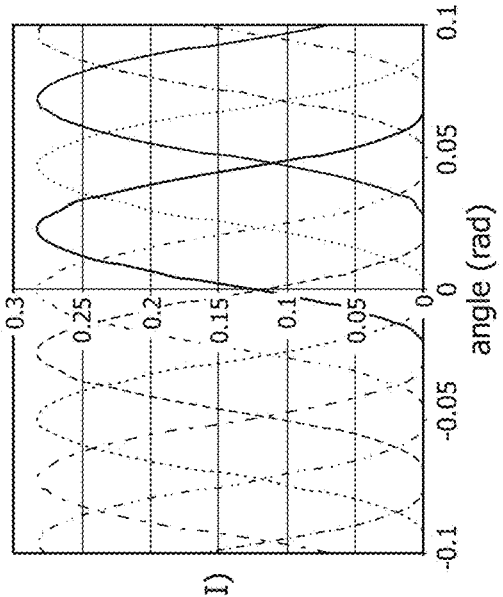
FIG. 9B

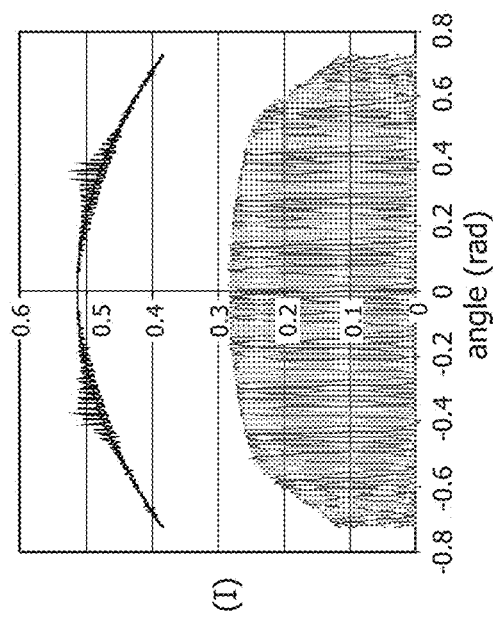
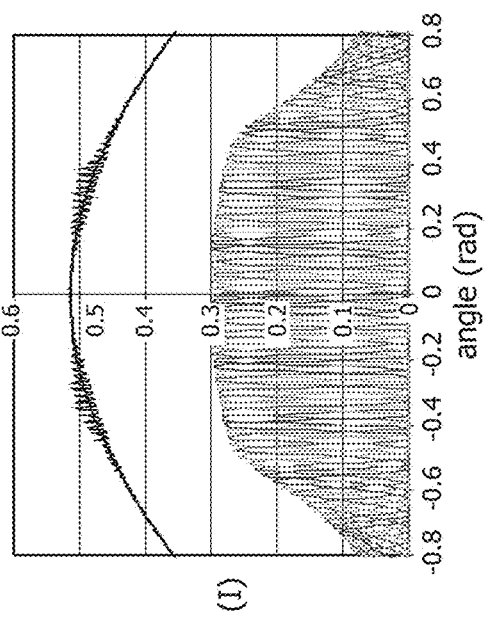
FIG. 10A
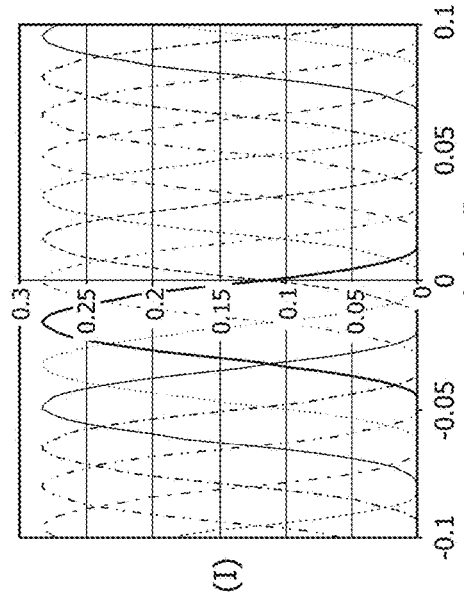
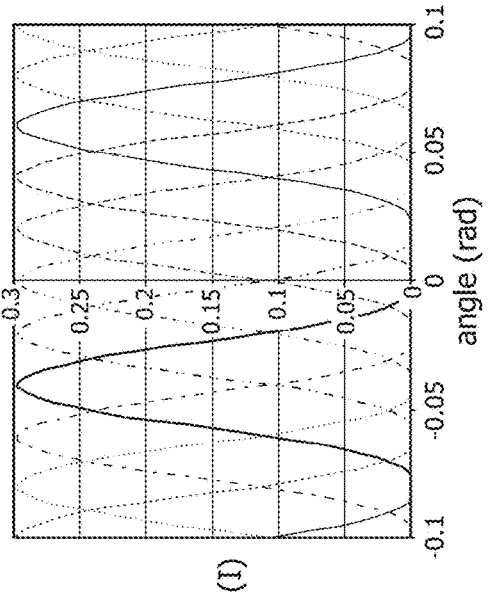
FIG. 10B

AUTOSTEREOSCOPIC IMAGE OUTPUT DEVICE

CROSS REFERENCE TO RELATED APPLICATION

This application is a continuation of prior U.S. patent application Ser. No. 12/865,865, filed Aug. 3, 2010, which is a national application of PCT Application No. PCT/IB2009/050491 filed Feb. 6, 2009 and claims the benefit of European Patent Application No. 08151279.0, filed Feb. 11, 2008, the entire contents of each of which are incorporated herein by reference thereto.

FIELD OF THE INVENTION

This invention relates to an autostereoscopic image output device comprising an image panel and a plurality of lenticular elements arranged over the image panel and through which the image is viewed.

BACKGROUND OF THE INVENTION

A known autostereoscopic display device is described in the paper entitled "Multiview 3D-LCD" by C. van Berkel et al. in SPIE Proceedings, Vol. 2653, 1996, pages 32-39. This known device comprises a two dimensional liquid crystal display panel having a row and column array of display pixels acting as a spatial light modulator to produce the display. An array of elongate lenticular elements extending parallel to one another overlies the display pixel array, and the display pixels are observed through these lenticular elements.

The lenticular elements are provided as a sheet of elements, each of which comprises an elongate semi-cylindrical lens element. The lenticular elements extend in the column direction of the display panel, with each lenticular element overlying a respective group of two or more adjacent columns of display pixels.

In an arrangement in which, for example, each lenticule is associated with two columns of display pixels, the display pixels in each column provide a vertical slice of a respective two dimensional sub-image. The lenticular sheet directs these two slices and corresponding slices from the display pixel columns associated with the other lenticules, to the left and right eyes of a user positioned in front of the sheet, so that the user observes a single stereoscopic image.

In other arrangements, each lenticule is associated with a group of four or more adjacent display pixels in the row direction. Corresponding columns of display pixels in each group are arranged appropriately to provide a vertical slice from a respective two dimensional sub-image. As a user's head is moved from left to right a series of successive, different, stereoscopic views are perceived creating, for example, a look-around impression.

The above described device provides an effective three dimensional display. However, it will be appreciated that, in order to provide stereoscopic views, there is a necessary sacrifice in the horizontal resolution of the device. For example, a display panel having an array of 600 rows and 800 columns of display pixels may provide a four-view autostereoscopic display in which each view comprises an array of 600 rows and 200 pixels. This substantial difference between the vertical and horizontal resolution is undesirable.

U.S. Pat. No. 6,064,424 discloses an autostereoscopic display device similar to that described above, except that the elongate lenticular elements are slanted at an angle to the column direction of the display panel. By slanting the lenticular elements, some of the reduction in horizontal resolution, which would otherwise be required, is transferred to the vertical resolution. It thus becomes possible to "consume" both vertical and horizontal resolution to increase the number views displayed by the device.

Since the displays are intended to be viewed by persons standing or sitting in an upright position, they are designed such that the views extend mainly in the horizontal direction. For this reason, the slant direction of the cylindrical lenses is chosen such that the angle between the lenses and the vertical direction is relatively small. The almost vertical lenses combined with the favorable horizontal-to-vertical aspect ratio of the sub-pixels (1:3 for most panels), yields a good view separation and a good pixel structure. As a consequence, these products are particularly suitable for use in "landscape" mode.

SUMMARY OF THE INVENTION

For some applications, like in 3D signage, a portrait mode is sometimes preferred instead of a landscape mode. In that case, the underlying LCD display must be rotated. Because the sub-pixels now extend into the horizontal direction instead of the vertical direction, a more or less vertical lens arrangement yields an unfavorable result with respect to view separation and pixel structure.

It is an object of the invention to provide a display that can be used in landscape or portrait mode.

The invention is defined by the independent claims. The dependent claims define advantageous embodiments.

According to the invention, there is provided an autostereoscopic image output device comprising:
   an image panel having an array of image pixels defining an image, the image pixels being arranged in rows and columns, the rows longer than the columns; and
   an array of parallel lenticular elements positioned over the image panel, the lenticular elements having optical focal axes that are slanted at an angle $\phi$ to the image pixel columns,
wherein the image output device is operable in first and second modes, with the image panel and lenticular element array rotated by 90 degrees between the modes, thereby providing a landscape mode of operation and a portrait mode of operation.
and wherein the slant angle $\phi$ in the landscape mode satisfies:

$$1 \geq \tan \phi \geq 1/2.$$

The invention provides a specific range of slant angles which enables a 3D image device to be used in both the landscape and the portrait mode, while maintaining a good view-distribution and image pixel structure.

The range of angles ensures that there is sufficient slant in both orientations to provide the required view repetition.

The slant angle $\phi$ in the landscape mode preferably satisfies:

$$1 \geq \tan \phi \geq 0.6.$$

In one preferred example, the slant $\tan \phi$ in the landscape mode satisfies $\tan \phi \approx 2/3$.

In another preferred example, the slant $\tan(\phi)$ in the landscape mode satisfies $\tan \phi \approx 2R$, in which R is the effective width to height ratio of the image pixels.

The image panel can comprise a display device, and the image pixels then comprise display pixels. The pixels are preferably rectangular, with a ratio of width (in the row direction) to height (in the column direction) of the pixel display areas, in landscape mode, in the range 1:1.5 to 1:5, for example 1:3. Each lenticular element preferably overlies a plurality of display pixels in the row direction when in either mode.

BRIEF DESCRIPTION OF THE DRAWINGS

Embodiments of the invention will now be described, purely by way of example, with reference to the accompanying drawings, in which:

FIG. 9A (landscape) and FIG. 9B (portrait) show raytracing calculations of the landscape/portrait 3D display of FIG. 7; and FIG. 10 shows a comparison of the landscape views for a slant 2/3 configuration (FIG. 10A) and a slant 1/6 display (FIG. 10B).

DETAILED DESCRIPTION OF EMBODIMENTS

The invention provides a lens array with a specific range of slant angles, including a preferred value of slant (defined as $\tan \phi$) of $\tan \phi = 2/3$. This enables a 3D display to be used in both the landscape and the portrait mode.

Figure 1:
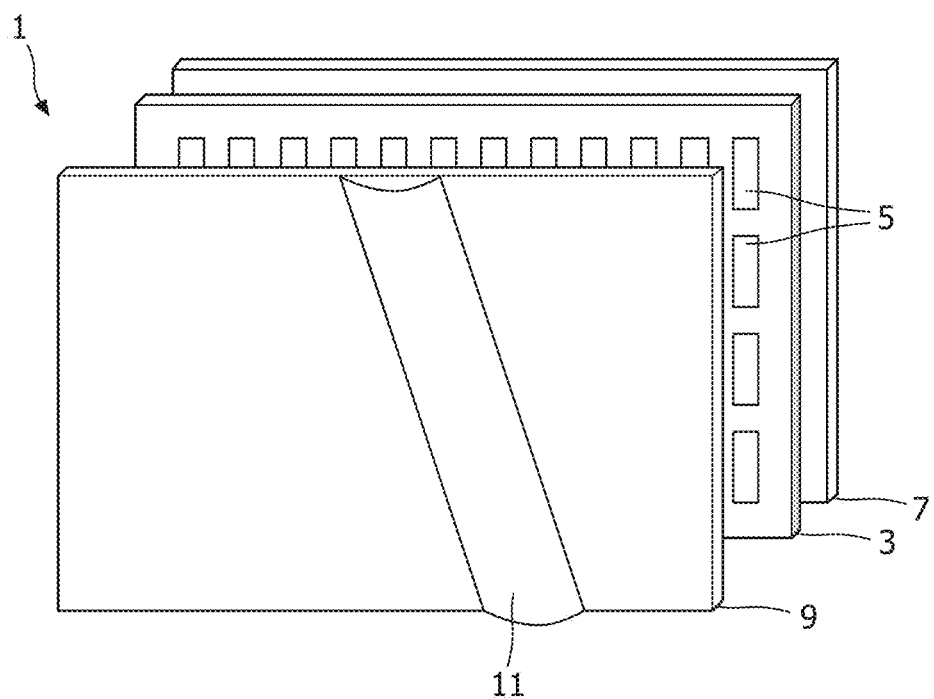
FIG. 1 is a schematic perspective view of a known autostereoscopic display device.

FIG. 1 is a schematic perspective view of a known direct view autostereoscopic display device 1. The known device 1 comprises a liquid crystal display panel 3 of the active matrix type that acts as a spatial light modulator to produce the display. Other types of display producing panels may be used such as cathode ray tube or light emitting diode panels.

The display panel 3 has an orthogonal array of display pixels 5 arranged in rows and columns. For the sake of clarity, only a small number of display pixels 5 are shown in the Fig. In practice, the display panel 3 might comprise about one thousand rows and several thousand columns of display pixels 5.

The structure of the liquid crystal display panel 3 is entirely conventional. In particular, the panel 3 comprises a pair of spaced transparent glass substrates, between which an aligned twisted nematic or other liquid crystal material is provided. The substrates carry patterns of transparent indium tin oxide (ITO) electrodes on their facing surfaces. Polarizing layers are also provided on the outer surfaces of the substrates.

Each display pixel 5 comprises opposing electrodes on the substrates, with the intervening liquid crystal material there between. The shape and layout of the display pixels 5 are determined by the shape and layout of the electrodes. The display pixels 5 are regularly spaced from one another by gaps.

Each display pixel 5 is associated with a switching element, such as a thin film transistor (TFT) or thin film diode (TFD). The display pixels are operated to produce the display by providing addressing signals to the switching elements, and suitable addressing schemes will be known to those skilled in the art.

The gaps between the display pixels 5 are covered by an opaque black mask. The mask is provided in the form of a grid of light absorbing material. The mask covers the switching elements and defines the individual display pixel areas.

The display panel 3 is illuminated by a light source 7 comprising, in this case, a planar backlight extending over the area of the display pixel array. Light from the light source 7 is directed through the display panel 3, with the individual display pixels 5 being driven to modulate the light and produce the display.

The display device 1 also comprises a lenticular sheet 9 arranged over the display side of the display panel 3. The lenticular sheet 9 comprises a row of lenticular elements 11 extending parallel to one another.

The lenticular elements 11, of which only one is shown, are slanted at an angle to the column direction of the display pixels 5, i.e. their longitudinal axis which is the same as the focal axis of the lenticular defines an acute angle with the column direction of the display pixels 5.

The lenticular elements 11 are in this example the form of convex cylindrical lenses. However non cylindrical lenses may also be used. The lenses act as an optical director means to provide different images, or views, from the display panel 3 to the eyes of a user positioned in front of the display device 1. The lenticular elements 11 also provide a number of different images, or views, to the eyes of the user as the user's head moves from left to right in front of the display device 1.

Figure 2:
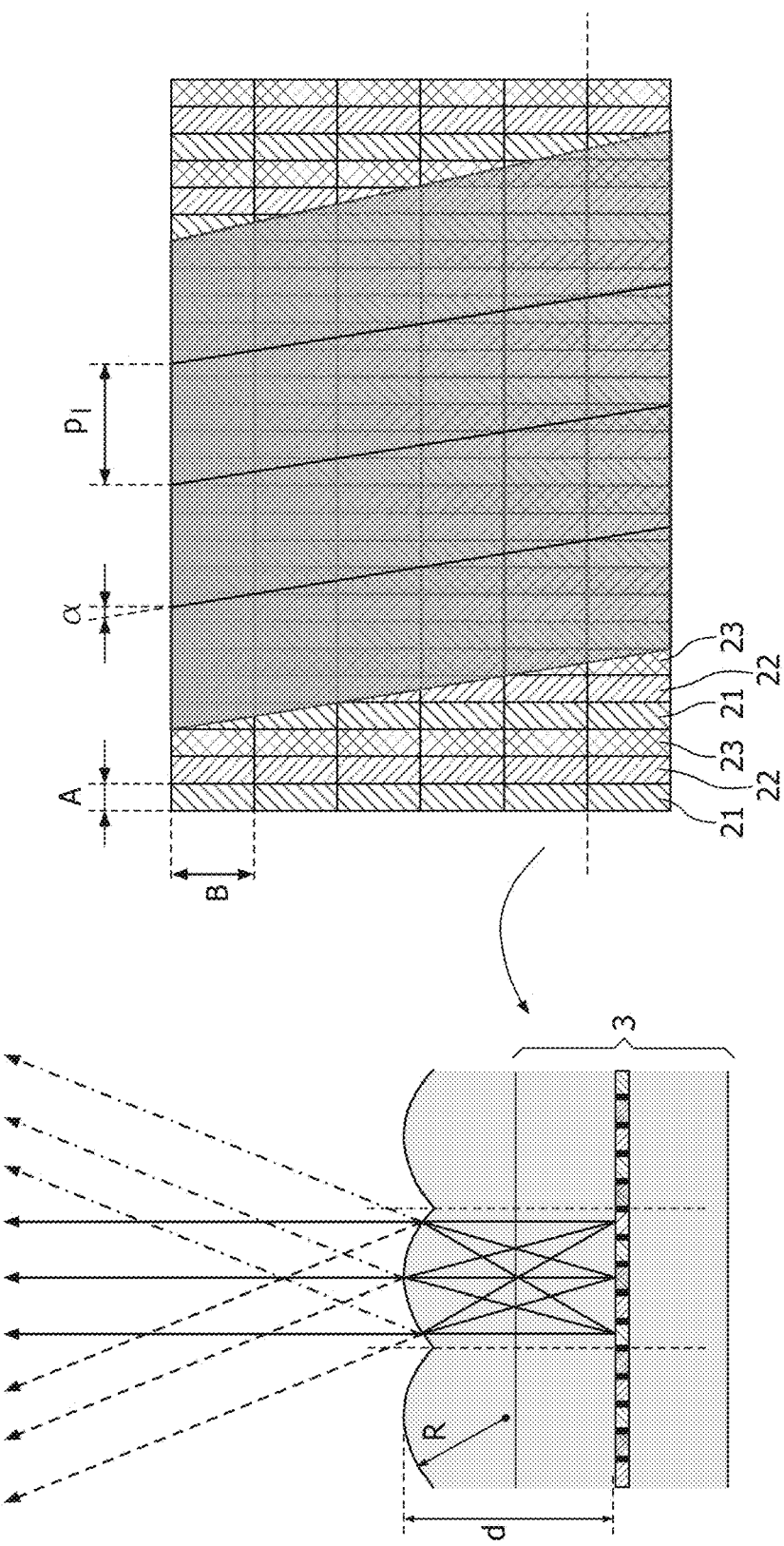
FIG. 2 is used to explain the light paths from a typical known 3D display.

FIG. 2 is used to explain the light paths from a typical known 3D display. For a 42" inch (107 cm) product with 9 views, the following parameters are used:

total glass thickness above the display panel d=6 mm
lens radius R=2.2 mm
slant $\tan (\phi) = 1/6$
pixel dimensions Height (B)=3×Width (A), with Width=161.5 μm
horizontal lens pitch $p_l$=4.5×Width.

FIG. 2 shows repeating sequences of columns 21, 22 and 23 of pixels each with width (A). Column 21 may represent pixels of red color, column 22 pixels of green color and column 23 pixels of blue color.

The left image in FIG. 2 shows how the output from different pixels under a lens is directed to different spatial locations, so that different views can be formed at different locations. In the example of FIG. 1, the lens and pixels are lined up every two lenses, corresponding to every nine pixels, so that nine different view locations can be generated.

Figure 3:
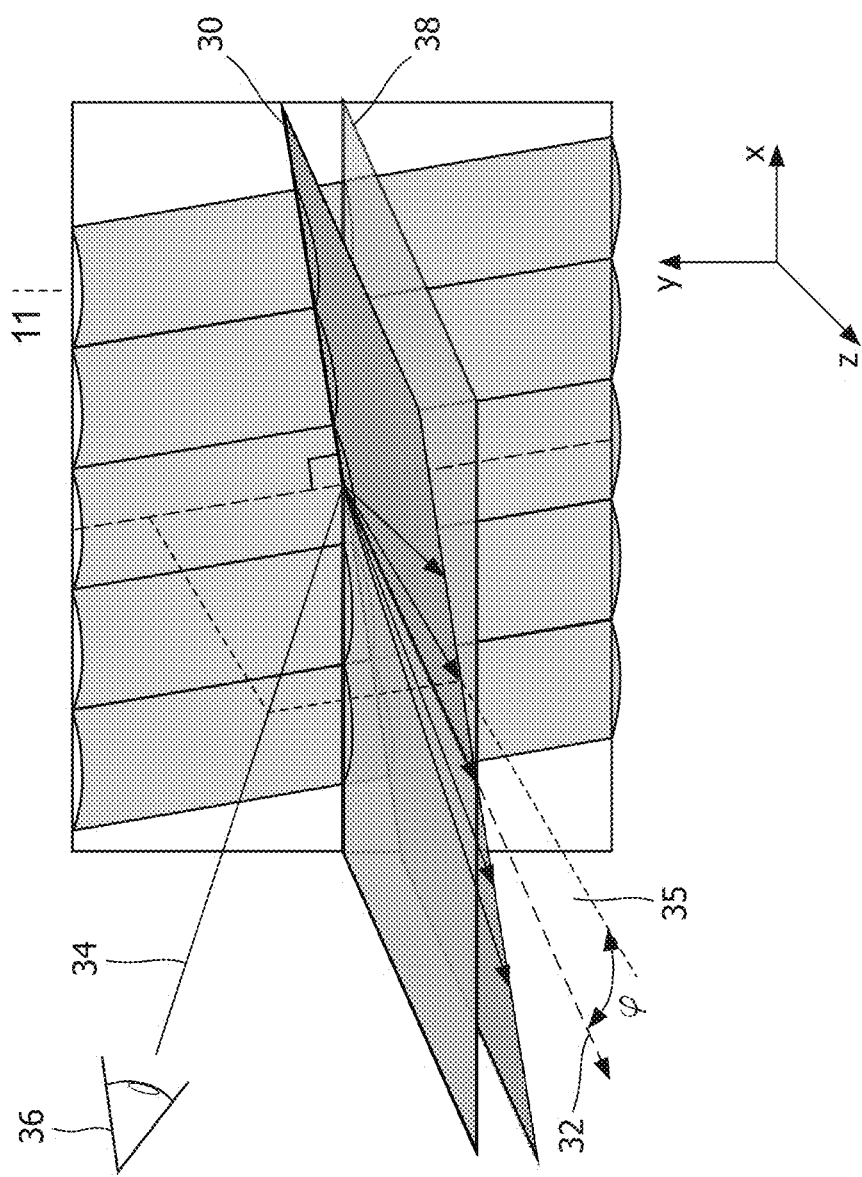
FIG. 3 shows the views generated by the device of FIG. 2.

FIG. 3 shows the "principal" view plane as 30. This tilted plane is the plane spanned by the lenticular axis and the surface normal. The view(s) that an observer can see, is determined by the angle $\phi$ between the surface normal 32 and the projection of the observation direction (vector 34) onto this view plane 30. This projected vector is shown as 35. Thus, the viewer 36 does not have to be directly in front of the display. A horizontal plane is shown as 38.

Figure 4:
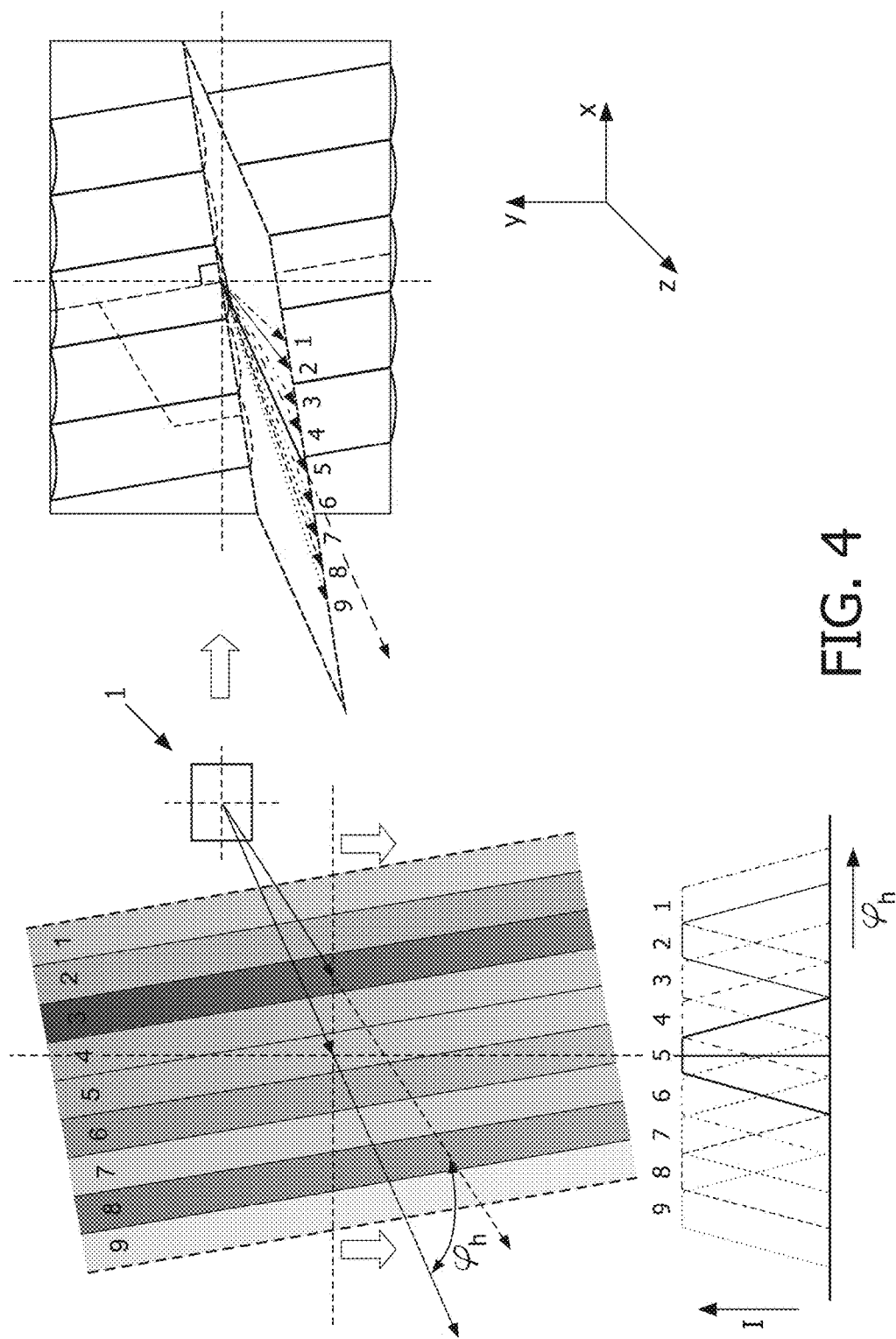
FIG. 4 shows the view zones distribution corresponding to FIG. 3.

FIG. 4 shows the view zones, numbered from 1 to 9. The view zones are defined in a plane parallel to the plane of the display and at a certain viewing distance, depending on the so called view-point-correction. This is a pitch correction in the lenticular to assure that a viewer located at that distance sees the same view(s) over the entire area of the display.

In practice there will be cross talk between the views, resulting in gradual transitions. The orientation of the view zones is the same as the orientation of the lenticulars.

The graph in the bottom left of FIG. 4 shows the view intensity (I) with distance from the normal direction. The intensity distributions for the 9 views, with a slant of tan $\phi=1/6$ (assuming ideal lenses) is indicated.

For the 3D effect, only the horizontal cross-section through the zones is relevant. The quantity $\phi_h$ denotes the angle with respect to the surface normal, measured in the horizontal plane.

Figure 5:
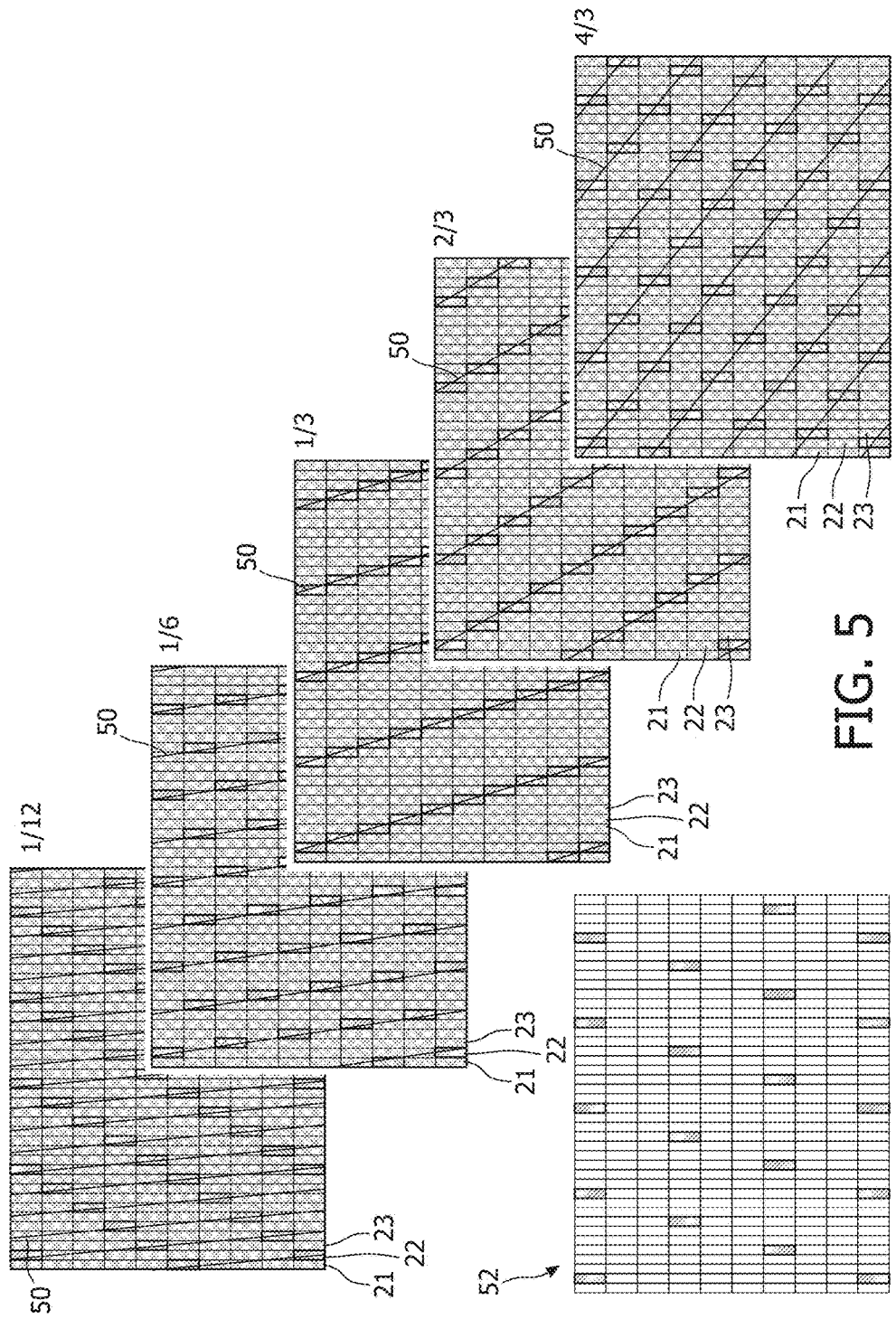
FIG. 5 shows pixel structures corresponding to different slant angles.

FIG. 5 shows pixel structures corresponding to different slants (1/12, 1/6, 1.3, 2/3, 4/3). The lens axes are denoted by the slanted lines 50. Again there are repeating sequences of columns of pixels 21, 22 and 23 having colors red, green and blue respectively in each of the representations for the slant angles. The bold pixels denote the pixels that are aligned with the lens axes and that are visible for a viewer in line with the surface normal. All structures apply to 9 view systems and have a basic single color pixel structure 52 as shown in the lower left image, wherein the bold pixels are of one ant the same color. The reason for this choice is that the basic pixel structure is favorable with respect to perceived resolution. The particular slants (general form $2^n/3$) are chosen because they generate view distributions that posses certain symmetry properties.

Figure 6:
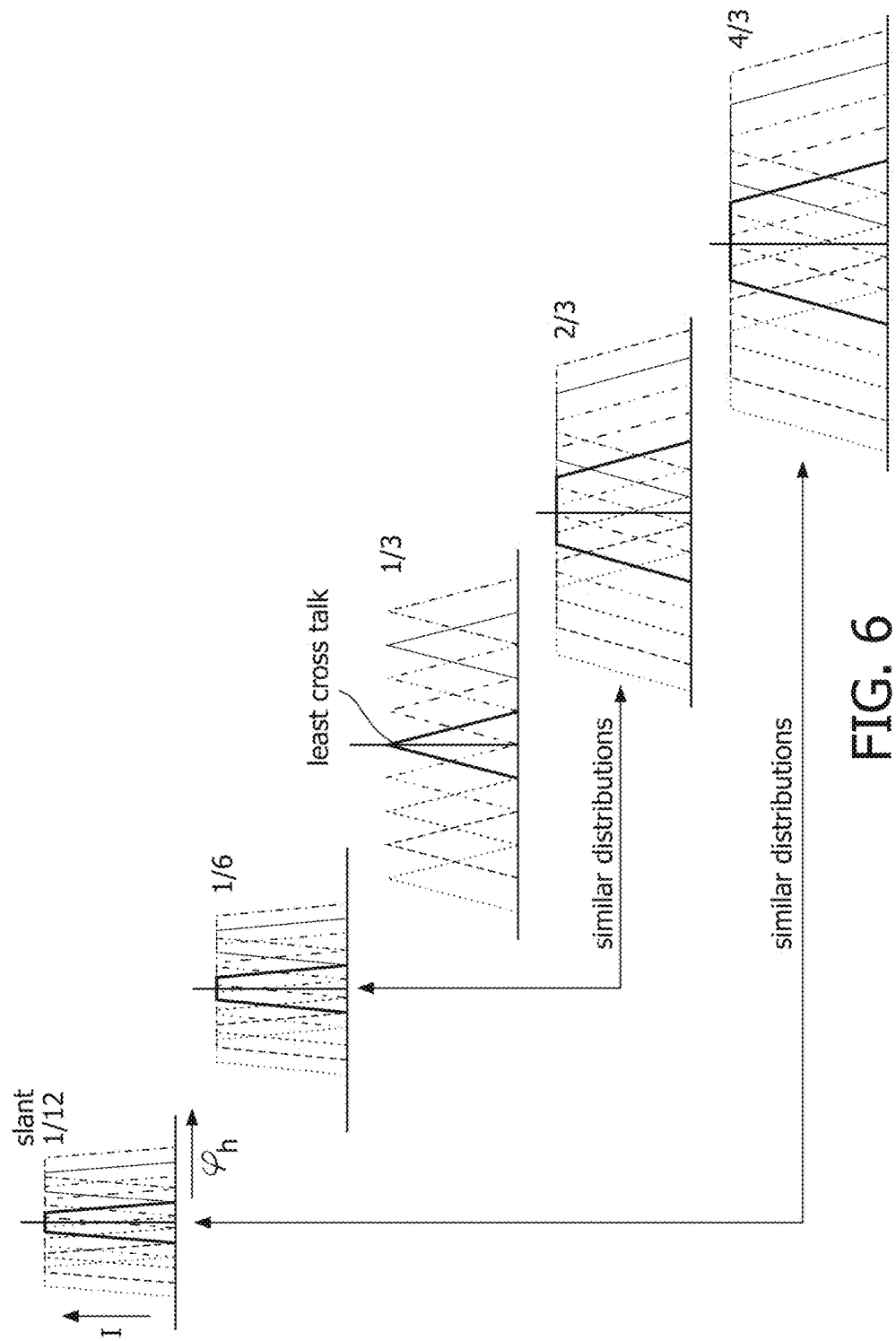
FIG. 6 shows the view distributions corresponding to the structures of FIG. 5.

FIG. 6 shows the view distributions, i.e. view intensity (I) with distance from the normal direction, as corresponding to the structures of FIG. 5. Note that $\phi_h$ denotes the angle with respect to the surface normal, measured in the horizontal plane. The structure with slant 1/3 has the least cross talk between the views. For slants equal to and exceeding 1/3, the view pitch is constant and equals one horizontal sub-pixel pitch in the pixel-plane. For a slant less than 1/3 the view pitch scales proportionally to the slant. Apart from the pitch variations, the view distributions on either side of the slant 1/3 distribution are very similar.

The slant 2/3 distribution is the "sister-distribution" of the slant 1/6 distribution. The same is true for the 1/12 distribution and the 4/3 distribution.

For practical use, the 1/12 and 4/3 distributions are not very interesting because they suffer from too much cross talk. The slant 1/6 configuration is widely used. It has somewhat more cross talk than the 1/3 configuration, but it has more favorable properties with respect to Moiré-type artifacts ("banding").

The slant 2/3 configuration has the same properties as the 1/6 configuration, except for the fact that it offers the opportunity to generate a view distribution in the vertical direction, which is very comparable to the distribution in the horizontal direction.

Figure 7:
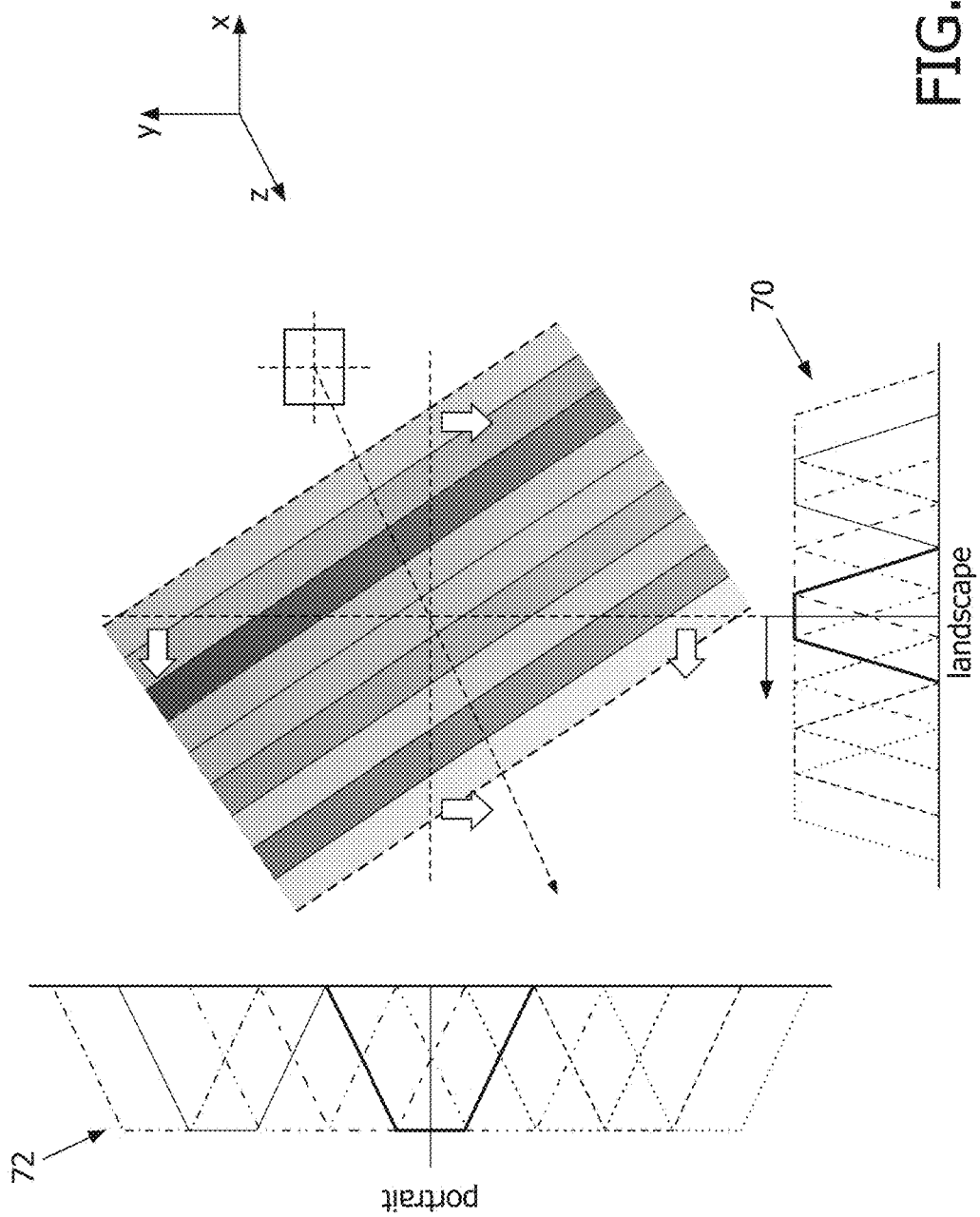
FIG. 7 shows the view zones for a 2/3 slant configuration of the invention.

FIG. 7 shows the view zones for a 2/3 slant configuration ($\alpha=33.7$ degrees). A horizontal cut through the zones generates the "landscape" view distribution 70 and a vertical cut generates a "portrait" view distribution 72. The pitch of the portrait distribution is 1.5 times the pitch of the landscape distribution.

By using the slant 2/3 configuration the display can be used both in the landscape and in the portrait mode. Of course, the rendering of the 3D image must be adapted depending on the mode.

Figure 8:
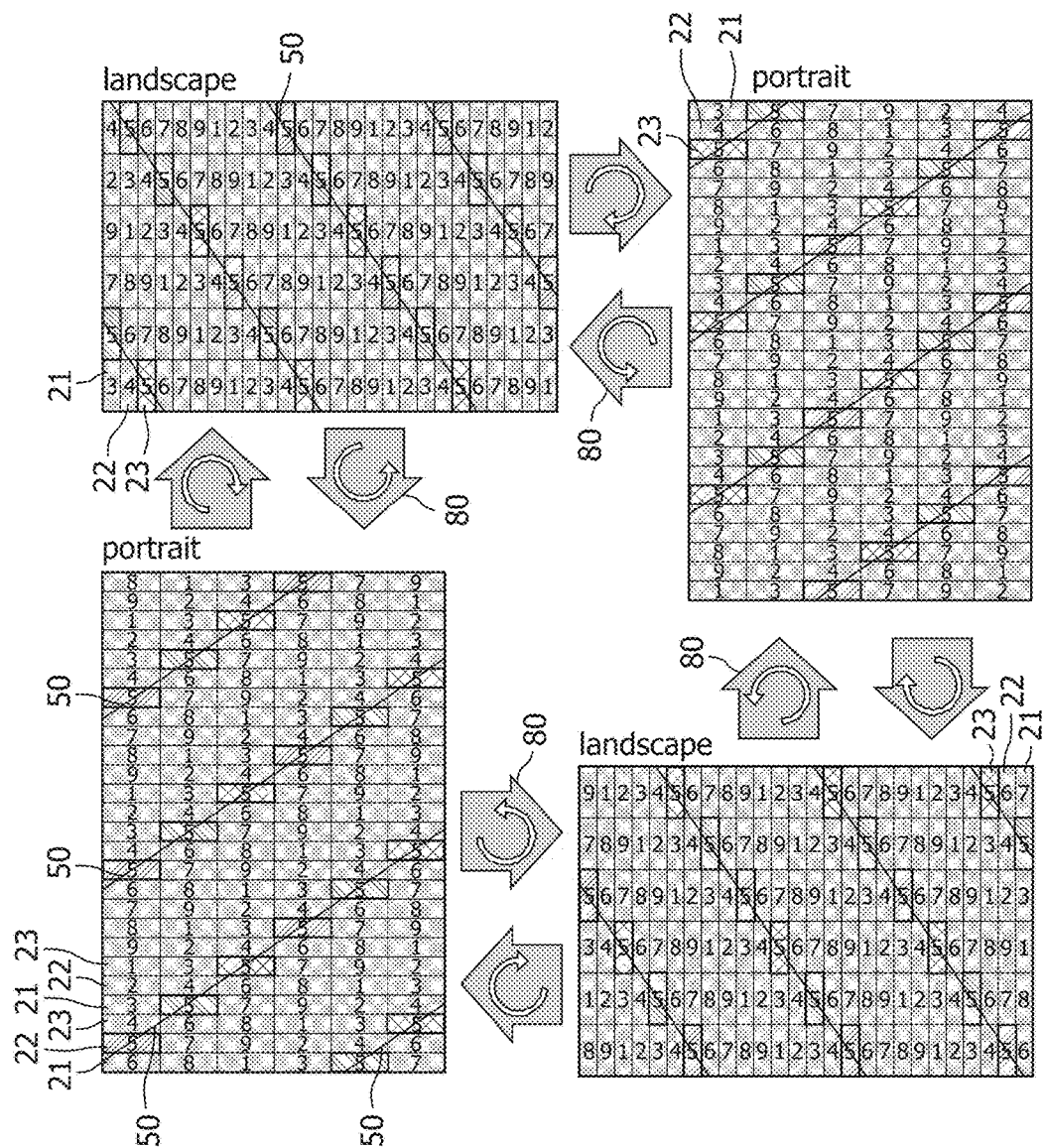
FIG. 8 shows the view mapping for different orientations of the display of FIG. 7.

FIG. 8 shows the view mapping for different orientations of the display. View number 1 corresponds to the rightmost view (as seen by the observer) in the horizontal plane. View number 5 corresponds to the central view emitted in the direction of the surface normal. Again all representations show repeating sequences of columns 21, 22 and 23 of pixels having colors red green and blue respectively. The lens axes are denoted by the slanted lines 50.

The top left image shows the normal landscape view configuration. The numbers associated with each pixel show the view number, and relate to the horizontal distance between the center of a pixel and the lens axis 50. This distance determines the outgoing angle of the respective view. In this example there are 9 different distances. In the landscape case, all distances occur in one single row. These distances are: −4, −3, −2, −1, 0, 1, 2, 3, 4 times the column pitch. The corresponding view numbers are 1 through 9. In the portrait case all distances occur in two columns (which run horizontally in this mode). They are: −2, −1.5, −1, −0.5, 0, 0.5, 1, 1.5, 2 times the row pitch. The corresponding view numbers are 1 through 9 again. The "integer" distances occur in one column and the half-numbered distances occur in an adjacent column.

FIG. 8 shows the four possible orientations of the display interchangeable through rotation in a certain direction as indicated by interchange arrows 80 each indicating a direction of rotation of the view mapping.

FIGS. 9A and B show ray-tracing calculations of the landscape (FIG. 9A) and portrait (FIG. 9B) 3D display with slant 2/3 in the form of view distributions, i.e. view intensity (I) with distance from the normal direction. The angle denotes the angle with respect to the surface normal, measured in the horizontal plane. The individual curves 90 show the individual views. The total intensity 92 is shown in the (undulating) upper curve in the figs. at the right. The total glass thickness (d) between the LCD pixels and the lenses has been chosen 15 mm, while the lens radius $R_{lens}=5.54$ mm. For this geometry, the landscape view pitch is somewhat smaller than the (landscape) view pitch of a standard slant 1/6 "wow" display, whereas the portrait view pitch is somewhat larger.

FIGS. 10A and B shows a comparison of the landscape views for a slant 2/3 configuration of FIG. 9 and a slant 1/6 wow display respectively. The display of FIG. 10B has glass thickness d=6 mm and lens radius $R_{lens}=2.24$ mm. Apart from a pitch difference, the shape of the views is very similar. This somewhat depends on the shape of the black matrix around and within the pixel. For pixels with a horizontal black matrix band in the middle the view shape of the slant 2/3 configuration tends to be less favorable than the slant 1/6 shape.

The description above gives a preferred angle of tan $\phi=2/3$. As explained above, this gives a good compromise between 3D effect in both landscape and portrait modes.

More generally, the 3D effect is achievable in both modes when in the landscape mode $1 \geq \tan \phi \geq 1/2$. Tan $\phi=1$ corresponds to 45 degrees, so that the slant angle is the same in portrait and landscape mode. As the value of tan $\phi$ is increased, the lenticulars become more upright when in the landscape mode, and the portrait mode 3D effect is degraded. At the limit of tan $\phi=1/2$, the lenticulars are 26.6 degrees versus 63.4 degrees. This represents a much greater slant than the conventional tan $\phi=1/6$ (9.5 degrees) so that 3D views in both modes can be achieved.

The preferred application of the invention is to autostereoscopic display devices, for example using a liquid crystal display panel. However, the invention can be applied to other applications, including static images such as digital picture frames, and electronic signage.

In the examples above, the pixels are rectangular, but this is not essential. Indeed, there have been proposals to modify the shape of pixels to match the lens slant in order to reduce cross talk. Such measures can also be employed in this application.

It will be seen that the preferred slant of 2/3, when combined with a pixel ratio 1/3, gives rise to twice as many pixels between lenses in the landscape mode compared to the portrait mode. In the example shown in FIG. 5, in the horizontal direction there are 9 column pitches between lenses in the landscape mode and 4.5 row pitches between lenses in the portrait mode. The preferred angle can thus be considered to be double the effective width to height ratio of the pixels (i.e. the ratio including borders around pixels).

Various modifications will be apparent to those skilled in the art.

The invention claimed is:

1. An autostereoscopic image output device comprising:
an image panel having image pixels defining an image, the image pixels being arranged in rows and columns, the rows being longer than the columns; and
lenticular elements parallel to each other and positioned over the image panel, the lenticular elements having optical focal axes that are slanted at a slant angle φ to the image pixel columns,
wherein the image output device is operable in first and second modes, with the image panels and the lenticular elements rotated by 90 degrees between the first and second modes to provide a landscape mode of operation and a portrait mode of operation, and
wherein the slant angle φ in the landscape mode is a function of an effective width to height ratio of the pixels and satisfies:
tan φ≈2R, R being the effective width to height ratio of the pixels.

2. The autostereoscopic image output device of claim 1, wherein the slant angle φ in the landscape mode satisfies tan φ≈2/3.

3. The autostereoscopic image output device of claim 1, wherein the slant angle φ in the landscape mode satisfies 1≥tan φ≈0.6.

4. The autostereoscopic image output device of claim 1, wherein the slant angle φ in the landscape mode satisfies 1≥tan φ≈0.5.

5. The autostereoscopic image output device of claim 1, wherein the image panel comprises a display device, and the image pixels comprise display pixel areas.

6. The autostereoscopic image output device of claim 5, wherein the display pixel areas have a rectangular shape.

7. The autostereoscopic image output device of claim 5, wherein each lenticular element of the lenticular elements overlies a plurality of display pixels in the row direction of the rows when in the landscape mode or the portrait mode.

8. The autostereoscopic image output device of claim 1, wherein the ratio in landscape mode is 1:3.

9. The autostereoscopic image output device of claim 1, wherein the rows and the columns of the image pixels are orthogonal.

10. The autostereoscopic image output device of claim 1, wherein the lenticular elements are configured to provide a plurality of views at a plurality of different horizontal distances between a center of a pixel of the image panel of pixels and a lens axis of a lenticular element of the lenticular elements, and wherein the plurality of different horizontal distances are integer values times a column pitch, and correspond to the plurality of views.

11. An autostereoscopic device comprising:
a panel rotatable by 90 degrees to provide autostereoscopic effects in landscape and portrait modes of operation, the panel including:
an orthogonal array of pixels arranged in rows and columns, each pixel having a pixel display area including a width in a direction of the rows longer than a height in a direction of the columns; and
lenticular elements parallel to each other and positioned over the image panel, the lenticular elements having optical focal axes that are slanted at a slant angle φ to the image pixel columns,
wherein the slant angle φ in the landscape mode is a function of an effective width to height ratio of the pixels and satisfies:
tan φ≈2R, R being the effective width to height ratio of the pixels.

12. The autostereoscopic image output device of claim 11, wherein the slant angle φ in the landscape mode satisfies tan φ≈2/3.

13. The autostereoscopic image output device of claim 11, wherein the slant angle φ in the landscape mode satisfies 1≥tan φ≈0.6.

14. The autostereoscopic image output device of claim 11, wherein the slant angle φ in the landscape mode satisfies 1≥tan φ≈0.5.

15. The autostereoscopic image output device of claim 11, wherein the pixel display pixel area has a rectangular shape.

16. The autostereoscopic image output device of claim 11, wherein each lenticular element of the lenticular elements overlies a plurality of pixels of the orthogonal array of pixels in the direction of the rows when in the landscape mode or the portrait mode.

17. The autostereoscopic image output device of claim 11, wherein the ratio in landscape mode is 1:3.

18. The autostereoscopic image output device of claim 11, wherein the lenticular elements are configured to provide a plurality of views at a plurality of different horizontal distances between a center of a pixel of the panel and a lens axis of a lenticular element of the lenticular elements, and wherein the plurality of different horizontal distances are integer values times a column pitch, and correspond to the plurality of views.

* * * * *